(12) United States Patent
Alden et al.

(10) Patent No.: US 8,888,877 B2
(45) Date of Patent: Nov. 18, 2014

(54) FORMING ALKALINE-EARTH METAL OXIDE POLISHING PAD

(75) Inventors: Donna M. Alden, Bear, DE (US); David B. James, Newark, DE (US); Andrew R. Wank, Avondale, PA (US); James Murnane, Norristown, PA (US)

(73) Assignee: Rohm and Haas Electronic Materials CMP Holdings, Inc., Newark, DE (US)

( * ) Notice: Subject to any disclaimer, the term of this patent is extended or adjusted under 35 U.S.C. 154(b) by 440 days.

(21) Appl. No.: 13/469,465

(22) Filed: May 11, 2012

(65) Prior Publication Data

US 2013/0298472 A1 Nov. 14, 2013

(51) Int. Cl.
*B24D 99/00* (2010.01)
*B07B 7/08* (2006.01)
*B07B 4/00* (2006.01)
*B01D 49/00* (2006.01)

(52) U.S. Cl.
USPC .......................................... 51/293; 209/133

(58) Field of Classification Search
CPC ............. B24D 99/00; B07B 7/08; B07B 4/00
See application file for complete search history.

(56) References Cited

U.S. PATENT DOCUMENTS

| 5,578,362 | A | 11/1996 | Reinhardt et al. |
| 8,202,334 | B2 | 6/2012 | Alden et al. |
| 8,257,152 | B2 | 9/2012 | Wank et al. |
| 2012/0117888 | A1 | 5/2012 | Wank et al. |

OTHER PUBLICATIONS

Copending U.S. Appl. No. 13/469,501.
Copending U.S. Appl. No. 13/469,527.
Matsui, et al., Principles and Applications of the Elbow-Jet Air Classifier, 1990, Tokyo, Japan.

*Primary Examiner* — Pegah Parvini
(74) *Attorney, Agent, or Firm* — Blake T. Biederman (57) ABSTRACT

The invention involves a method of preparing an alkaline-earth metal oxide-containing polishing pad useful for polishing at least one of semiconductor, magnetic and optical substrates. The method includes introducing a feed stream of gas-filled polymeric microelements into a gas jet, the polymeric microelements having varied density, varied wall thickness and varied particle size. The method passes the polymeric microelements in the gas jet adjacent a Coanda block, the Coanda block having a curved wall for separating the polymeric microelements with Coanda effect, inertia and gas flow resistance. Then it separates various alkaline earth metal oxide constituents from the curved wall of the Coanda block to clean the polymeric microelements.

10 Claims, 8 Drawing Sheets

FORMING ALKALINE-EARTH METAL OXIDE POLISHING PAD

BACKGROUND OF THE INVENTION

The present invention relates to polishing pads for chemical mechanical polishing (CMP), and in particular relates to polymeric composite polishing pads suitable for polishing at least one of semiconductor, magnetic or optical substrates.

Semiconductor wafers having integrated circuits fabricated thereon must be polished to provide an ultra-smooth and flat surface that must vary in a given plane by less than a fraction of a micron. This polishing is usually accomplished in a chemical-mechanical polishing (CMP) operation. These "CMP" operations utilize chemically active slurry that is buffed against the wafer surface by a polishing pad. The combination of the chemically active slurry and polishing pad combine to polish or planarize a wafer surface.

One problem associated with the CMP operation is wafer scratching. Certain polishing pads can contain foreign materials that result in gouging or scratching of the wafer. For example, the foreign material can result in chatter marks in hard materials, such as TEOS dielectrics. For purposes of this specification, TEOS represents the hard glass-like dielectric formed from the decomposition of tetraethyloxysilicates. This damage to the dielectric can result in wafer defects and lower wafer yield. Another scratching issue associated with foreign materials is the damaging of nonferrous interconnects, such as copper interconnects. If the pad scratches too deep into the interconnect line, the resistance of the line increases to a point where the semiconductor will not function properly. In extreme cases, these foreign materials create macro-scratches that can result in the scrapping of an entire wafer.

Reinhardt et al., in U.S. Pat. No. 5,572,362, describe a polishing pad that replaces glass spheres with hollow polymeric microelements to create porosity within a polymeric matrix. The advantages of this design include uniform polishing, low defectivity and enhanced removal rate. The IC1000™ polishing pad design of Reinhardt et al. outperformed the earlier IC60 polishing pad for scratching by replacing the glass shell with a polymeric shell. In addition, Reinhardt et al. discovered an unexpected maintenance in planarization efficiency associated with replacing hard glass spheres with softer polymeric microspheres. The polishing pads of Reinhardt et al. have long served as the industry standard for CMP polishing and continue to serve an important role in advanced CMP applications.

Another set of problems associated with the CMP operation are pad-to-pad variability, such as density variation and within pad variation. To address these problems polishing pad manufacturers have relied upon careful casting techniques with controlled curing cycles. These efforts have concentrated on the macro-properties of the pad, but did not address the micro-polishing aspects associated with polishing pad materials.

There is an industry desire for polishing pads that provide an improved combination of planarization, removal rate and scratching. In addition, there remains a demand for a polishing pad that provides these properties in a polishing pad with less pad-to-pad variability.

STATEMENT OF THE INVENTION

An aspect of the invention, includes the following: a method of preparing a alkaline-earth metal oxide-containing polishing pad useful for polishing at least one of semiconductor, magnetic and optical substrates comprising: introducing a feed stream of gas-filled polymeric microelements into a gas jet, the polymeric microelements having varied density, varied wall thickness and varied particle size, the polymeric microelements having alkaline-earth metal oxide-containing regions distributed on an outer surface of the polymeric microelements, the alkaline-earth metal oxide-containing regions being spaced to coat 1 to 40 percent of the outer surface of the polymeric microelements; and being associated with greater than a 0.1 weight percent total of the following: i) alkaline-earth metal oxide-containing particles having a particle size of greater than 5 µm; ii) alkaline-earth metal oxide-containing regions covering greater than 50 percent of the outer surface of the polymeric microelements; and iii) polymeric microelements agglomerated with alkaline-earth metal oxide-containing-particles to an average cluster size of greater than 120 µm; passing the polymeric microelements in the gas jet adjacent a Coanda block, the Coanda block having a curved wall for separating the polymeric microelements with Coanda effect, in the outer surface of the polymeric microelements; and iii) polymeric microelements agglomerated with alkaline-earth metal oxide-containing particles to an average cluster size of greater than 120 μm associated with the polymeric microelements from the curved wall of the Coanda block to clean the polymeric microelements; collecting the polymeric microelements with less than 0.1 weight percent total of the polymeric microelements being associated with i) alkaline-earth metal oxide-containing particles having a particle size of greater than 5 μm; ii) alkaline-earth metal oxide-containing regions covering greater than 50 percent of the outer surface of the polymeric microelements; and iii) polymeric microelements agglomerated with alkaline-earth metal oxide-containing particles to an average cluster size of greater than 120 μm; and inserting the polymeric microelements into a polymeric matrix to form a polishing pad.

DETAILED DESCRIPTION OF THE INVENTION

The invention provides a method for forming a composite alkaline earth metal oxide-containing polishing pad useful for polishing semiconductor substrates. The polishing pad includes a polymeric matrix, hollow polymeric microelements and alkaline earth metal oxide-containing particles embedded in the polymeric microelements. The alkaline earth element is preferably calcium oxide, magnesium oxide or a mixture of magnesium and calcium oxides. Surprisingly, the alkaline earth metal oxide-containing particles do not tend to result in excessive scratching or gouging for advanced CMP applications when classified to a specific structure associated with polymeric microelements. This limited gouging and scratching occurs despite the polymeric matrix having alkaline earth metal oxide-containing particles at its polishing surface.

Typical polymeric polishing pad matrix materials include polycarbonate, polysulfone, polyamides, ethylene copolymers, polyethers, polyesters, polyether-polyester copolymers, acrylic polymers, polymethyl methacrylate, polyvinyl chloride, polycarbonate, polyethylene copolymers, polybutadiene, polyethylene imine, polyurethanes, polyether sulfone, polyether imide, polyketones, epoxies, silicones, copolymers thereof and mixtures thereof. Preferably, the polymeric material is a polyurethane; and may be either a cross-linked a non-cross-linked polyurethane. For purposes of this specification, "polyurethanes" are products derived from difunctional or polyfunctional isocyanates, e.g. polyetherureas, polyisocyanurates, polyurethanes, polyureas, polyurethaneureas, copolymers thereof and mixtures thereof.

Preferably, the polymeric material is a block or segmented copolymer capable of separating into phases rich in one or more blocks or segments of the copolymer. Most preferably, the polymeric material is a polyurethane. Cast polyurethane matrix materials are particularly suitable for planarizing semiconductor, optical and magnetic substrates. An approach for controlling a pad's polishing properties is to alter its chemical composition. In addition, the choice of raw materials and manufacturing process affects the polymer morphology and the final properties of the material used to make polishing pads.

Preferably, urethane production involves the preparation of an isocyanate-terminated urethane prepolymer from a polyfunctional aromatic isocyanate and a prepolymer polyol. For purposes of this specification, the term prepolymer polyol includes diols, polyols, polyol-diols, copolymers thereof and mixtures thereof. Preferably, the prepolymer polyol is selected from the group comprising polytetramethylene ether glycol [PTMEG], polypropylene ether glycol [PPG], ester-based polyols, such as ethylene or butylene adipates, copolymers thereof and mixtures thereof. Example polyfunctional aromatic isocyanates include 2,4-toluene diisocyanate, 2,6-toluene diisocyanate, 4,4'-diphenylmethane diisocyanate, naphthalene-1,5-diisocyanate, tolidine diisocyanate, para-phenylene diisocyanate, xylylene diisocyanate and mixtures thereof. The polyfunctional aromatic isocyanate contains less than 20 weight percent aliphatic isocyanates, such as 4,4'-dicyclohexylmethane diisocyanate, isophorone diisocyanate and cyclohexanediisocyanate. Preferably, the polyfunctional aromatic isocyanate contains less than 15 weight percent aliphatic isocyanates and more preferably, less than 12 weight percent aliphatic isocyanate.

Example prepolymer polyols include polyether polyols, such as, poly(oxytetramethylene)glycol, poly(oxypropylene) glycol and mixtures thereof, polycarbonate polyols, polyester polyols, polycaprolactone polyols and mixtures thereof. Example polyols can be mixed with low molecular weight polyols, including ethylene glycol, 1,2-propylene glycol, 1,3-propylene glycol, 1,2-butanediol, 1,3-butanediol, 2-methyl-1,3-propanediol, 1,4-butanediol, neopentyl glycol, 1,5-pentanediol, 3-methyl-1,5-pentanediol, 1,6-hexanediol, diethylene glycol, dipropylene glycol, tripropylene glycol and mixtures thereof.

Preferably the prepolymer polyol is selected from the group comprising polytetramethylene ether glycol, polyester polyols, polypropylene ether glycols, polycaprolactone polyols, copolymers thereof and mixtures thereof. If the prepolymer polyol is PTMEG, copolymer thereof or a mixture thereof, then the isocyanate-terminated reaction product preferably has a weight percent unreacted NCO range of 8.0 to 20.0 weight percent. For polyurethanes formed with PTMEG or PTMEG blended with PPG, the preferable weight percent NCO is a range of 8.75 to 12.0; and most preferably it is 8.75 to 10.0. Particular examples of PTMEG family polyols are as follows: Terathane® 2900, 2000, 1800, 1400, 1000, 650 and 250 from Invista; Polymeg® 2900, 2000, 1000, 650 from Lyondell; PolyTHF® 650, 1000, 2000 from BASF, and lower molecular weight species such as 1,2-butanediol, 1,3-butanediol, and 1,4-butanediol. If the prepolymer polyol is a PPG, copolymer thereof or a mixture thereof, then the isocyanate-terminated reaction product most preferably has a weight percent unreacted NCO range of 7.9 to 15.0 wt. %. Particular examples of PPG polyols are as follows: Arcol® PPG-425, 725, 1000, 1025, 2000, 2025, 3025 and 4000 from Bayer; Voranol® 1010L, 2000L, and P400 from Dow; Desmophen® 1110BD, Acclaim® Polyol 12200, 8200, 6300, 4200, 2200 both product lines from Bayer. If the prepolymer polyol is an ester, copolymer thereof or a mixture thereof; then the isocyanate-terminated reaction product most preferably has a weight percent unreacted NCO range of 6.5 to 13.0. Particular examples of ester polyols are as follows: Millester 1, 11, 2, 23, 132, 231, 272, 4, 5, 510, 51, 7, 8, 9, 10,16, 253, from Polyurethane Specialties Company, Inc.; Desmophen® 1700, 1800, 2000, 2001KS, 2001K$^2$, 2500, 2501, 2505, 2601, PE65B from Bayer; Rucoflex S-1021-70, S-1043-46, S-1043-55 from Bayer.

Typically, the prepolymer reaction product is reacted or cured with a curative polyol, polyamine, alcohol amine or mixture thereof. For purposes of this specification, polyamines include diamines and other multifunctional amines. Example curative polyamines include aromatic diamines or polyamines, such as, 4,4'-methylene-bis-o-chloroaniline [MBCA], 4,4'-methylene-bis-(3-chloro-2,6-diethylaniline) [MCDEA]; dimethylthiotoluenediamine; trimethyleneglycol di-p-aminobenzoate; polytetramethyleneoxide di-p-aminobenzoate; polytetramethyleneoxide mono-p-aminobenzoate; polypropyleneoxide di-p-aminobenzoate; polypropyleneoxide mono-p-aminobenzoate; 1,2-bis(2-aminophenylthio)ethane; 4,4'-methylene-bis-aniline; diethyltoluenediamine; 5-tert-butyl-2,4- and 3-tert-butyl-2,6-toluenediamine; 5-tert-amyl-2,4- and 3-tert-amyl-2,6-toluenediamine and chlorotoluenediamine. Optionally, it is possible to manufacture urethane polymers for polishing pads with a single mixing step that avoids the use of prepolymers.

The components of the polymer used to make the polishing pad are preferably chosen so that the resulting pad morphology is stable and easily reproducible. For example, when mixing 4,4'-methylene-bis-o-chloroaniline [MBCA] with diisocyanate to form polyurethane polymers, it is often advantageous to control levels of monoamine, diamine and triamine. Controlling the proportion of mono-, di- and triamines contributes to maintaining the chemical ratio and resulting polymer molecular weight within a consistent range. In addition, it is often important to control additives such as anti-oxidizing agents, and impurities such as water for consistent manufacturing. For example, since water reacts with isocyanate to form gaseous carbon dioxide, controlling the water concentration can affect the concentration of carbon dioxide bubbles that form pores in the polymeric matrix. Isocyanate reaction with adventitious water also reduces the available isocyanate for reacting with chain extender, so changes the stoichiometry along with level of crosslinking (if there is an excess of isocyanate groups) and resulting polymer molecular weight.

The polyurethane polymeric material is preferably formed from a prepolymer reaction product of toluene diisocyanate and polytetramethylene ether glycol with an aromatic diamine. Most preferably the aromatic diamine is 4,4'-methylene-bis-o-chloroaniline or 4,4'-methylene-bis-(3-chloro-2,6-diethylaniline). Preferably, the prepolymer reaction product has a 6.5 to 15.0 weight percent unreacted NCO. Examples of suitable prepolymers within this unreacted NCO range include: Imuthane® prepolymers PET-70D, PHP-70D, PET-75D, PHP-75D, PPT-75D, PHP-80D manufactured by COIM USA, Inc. and Adiprene® prepolymers, LFG740D, LF700D, LF750D, LF751D, LF753D, L325 manufactured by Chemtura. In addition, blends of other prepolymers besides those listed above could be used to reach to appropriate percent unreacted NCO levels as a result of blending. Many of the above-listed prepolymers, such as, LFG740D, LF700D, LF750D, LF751D, and LF753D are low-free isocyanate prepolymers that have less than 0.1 weight percent free TDI monomer and have a more consistent prepolymer molecular weight distribution than conventional prepolymers, and so facilitate forming polishing pads with excellent polishing characteristics. This improved prepolymer molecular weight consistency and low free isocyanate monomer give a more regular polymer structure, and contribute to improved polishing pad consistency. For most prepolymers, the low free isocyanate monomer is preferably below 0.5 weight percent. Furthermore, "conventional" prepolymers that typically have higher levels of reaction (i.e. more than one polyol capped by a diisocyanate on each end) and higher levels of free toluene diisocyanate prepolymer should produce similar results. In addition, low molecular weight polyol additives, such as, diethylene glycol, butanediol and tripropylene glycol facilitate control of the prepolymer reaction product's weight percent unreacted NCO.

Similarly, the polyurethane polymeric material may be formed from a prepolymer reaction product of 4,4'-diphenylmethane diisocyanate (MDI) and polytetramethylene glycol with a diol. Most preferably, the diol is 1,4-butanediol (BDO). Preferably, the prepolymer reaction product has 6 to 13 wt % unreacted NCO. Examples of suitable polymers with this unreacted NCO range include the following: Imuthane 27-85A, 27-90A, 27-95A, 27-52D, 27-58D from COIM USA and Andur® IE-75AP, IE80AP, IE90AP, IE98AP, IE110AP prepolymers from Anderson Development Company.

In addition to controlling weight percent unreacted NCO, the curative and prepolymer reaction product typically has an OH or $NH_2$ to unreacted NCO stoichiometric ratio of 85 to 115 percent, preferably 90 to 100 percent. This stoichiometry could be achieved either directly, by providing the stoichiometric levels of the raw materials, or indirectly by reacting some of the NCO with water either purposely or by exposure to adventitious moisture.

The polymeric matrix contains polymeric microelements distributed within the polymeric matrix and at the polishing surface of the polymeric matrix. The polymeric microelements have an outer surface and are fluid-filled for creating texture at the polishing surface. The fluid filling the matrix can be a liquid or a gas. If the fluid is a liquid, then the preferred fluid is water, such as distilled water that only contains incidental impurities. If the fluid is a gas, then air, nitrogen, argon, carbon dioxide or combination thereof is preferred. For some microelements, the gas may be an organic gas, such as isobutane. The gas-filled polymeric microelements typically have an average size of 5 to 200 microns. Preferably, the gas-filled polymeric microelements typically have an average size of 10 to 100 microns. Most preferably, the gas-filled polymeric microelements typically have an average size of 10 to 80 microns. Although not necessary, the polymeric microelements preferably have a spherical shape or represent microspheres. Thus, when the microelements are spherical, the average size ranges also represent diameter ranges. For example, average diameter ranges of 5 to 200 microns, preferably 10 to 100 microns and most preferably 10 to 80 microns.

The polishing pad contains alkaline earth (Group IIA of the Periodic Table) metal oxide-containing regions distributed within each of the polymeric microelements. These alkaline earth metal oxide-containing regions may be particles or have an elongated alkaline earth metal oxide-containing structure. Typically, the alkaline earth metal oxide-containing regions represent particles embedded or attached to the polymeric microelements. The average particle size of the alkaline earth metal oxide-containing particles is typically 0.01 to 3 $\mu$m. Preferably, the average particle size of the alkaline earth metal oxide-containing particles is 0.01 to 2 $\mu$m. These alkaline earth metal oxide-containing particles are spaced to coat less than 50 percent of the outer surface of the polymeric microelements. Preferably, the alkaline earth metal oxide-containing regions cover 1 to 40 percent of the surface area of the polymeric microelements. Most preferably, the alkaline earth metal oxide-containing regions cover 2 to 30 percent of the surface area of the polymeric microelements. The alkaline earth metal oxide-containing microelements have a density of 5 g/liter to 200 g/liter. Typically, the alkaline earth metal oxide-containing microelements have a density of 10 g/liter to 100 g/liter.

In order to avoid increased scratching or gouging, it is important to avoid alkaline earth metal oxide-containing particles with disadvantageous structure or morphology. These disadvantageous alkaline earth metal oxide-containing particles should total less than 0.1 weight percent total of the polymeric microelements. Preferably, these disadvantageous alkaline earth metal oxide-containing particles should total less than 0.05 weight percent total of the polymeric microelements. The first type of disadvantageous alkaline earth metal oxide-containing particles is alkaline earth metal oxide-containing particles having a particle size of greater than 5 $\mu$m. These alkaline earth metal oxide-containing particles are known to result in chatter defects in TEOS wafers, and scratch and gouge defects in copper interconnects. The second type of disadvantageous alkaline earth metal oxide-containing particles is alkaline earth metal oxide-containing regions covering greater than 50 percent of the outer surface of the polymeric microelements. These microelements containing a large alkaline earth metal oxide-containing surface area also can scratch wafers or dislodge with the microelements to result in chatter defects in TEOS wafers, and scratch and gouge defects in copper interconnects. The third type of disadvantageous alkaline earth metal oxide-containing particles is agglomerates. Specifically, polymeric microelements can agglomerate with alkaline earth metal oxide-containing particles to an average cluster size of greater than 120 $\mu$m. The 120 $\mu$m agglomeration size is typical for microelements having an average diameter of about 40 $\mu$m. Larger microelements will form larger agglomerates. Alkaline earth metal oxide-containing particles with this morphology can result in visual defects and scratching defects with sensitive polishing operations.

Air classification can be useful to produce the composite alkaline earth metal oxide-containing polymeric microelements with minimal disadvantageous alkaline earth metal oxide-containing particle species. Unfortunately, alkaline earth metal oxide-containing polymeric microelements often have variable density, variable wall thickness and variable particle size. In addition, the polymeric microelements have varied alkaline earth metal oxide-containing regions distributed on their outer surfaces. Thus, separating polymeric microelements with various wall thicknesses, particle size and density has multiple challenges and multiple attempts at centrifugal air classification and particle screening failed. These processes are useful for at best removing one disadvantageous ingredient from the feedstock, such as fines. For example, because much of the alkaline earth metal oxide-containing microspheres have the same size as the desirous alkaline earth metal oxide-containing composite, it is difficult to separate these using screening methods. It has been discovered, however, that separators that operate with a combination of inertia, gas or air flow resistance and the Coanda effect can provide effective results. The Coanda effect states that if a wall is placed on one side of a jet, then that jet will tend to flow along the wall. Specifically, passing gas-filled microelements in a gas jet adjacent a curved wall of a Coanda block separates the polymeric microelements. The coarse polymeric microelements separate from the curved wall of the Coanda block to clean the polymeric microelements in a two-way separation. When the feed stock includes alkaline earth metal oxide-containing fines, the process may include the additional step of separating the polymeric microelements from the alkaline earth metal oxide-containing fines with the wall of the Coanda block with the fines following the Coanda block. In a three-way separation, coarse separates the greatest distance from the Coanda block, the middle or cleaned cut separates an intermediate distance and the fines follow the Coanda block. The Matsubo Corporation manufactures elbow-jet air classifiers that take advantage of these features for effective particle separation. In addition to the feedstock jet, the Matsubo separators provide an additional step of directing two additional gas streams into the polymeric microelements to facilitate separating the polymeric microelements from the coarse particles associated with polymeric microelements.

The separating of the alkaline earth metal oxide-containing particle fines and coarse particles associated with the polymeric microelements advantageously occurs in a single step. Although a single pass is effective for removing both coarse and fine materials, it is possible to repeat the separation through various sequences, such as first coarse pass, second coarse and then first fine pass and second fine pass. Typically, the cleanest results, however, originate from two or three-way separations. The disadvantages of additional three-way separations are yield and cost. The feed stock typically contains greater than 0.1 weight percent disadvantageous alkaline earth metal oxide-containing particles. Furthermore, it is effective with greater than 0.2 weight percent and greater than 1 weight percent disadvantageous alkaline earth metal oxide-containing particle feedstocks.

After separating out or cleaning the polymeric microelements, inserting the polymeric microelements into a liquid polymeric matrix forms the polishing pad. The typical means for inserting the polymeric microelements into the pad include casting, extrusion, aqueous-solvent substitution and aqueous dispersion polymers. Mixing improves the distribution of the polymeric microelements in a liquid polymer matrix. After mixing, drying or curing the polymer matrix forms the polishing pad suitable for grooving, perforating or other polishing pad finishing operations.

Figure 1A:
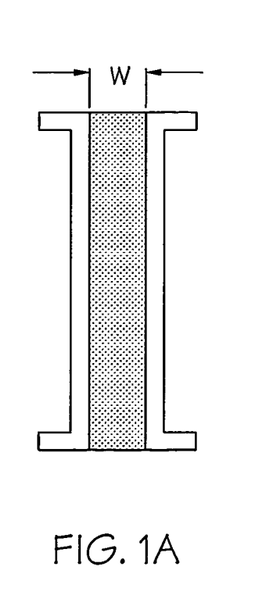
FIG. 1A represents a schematic side-view-cross-section of a Coanda block air classifier.
Figure 1B:
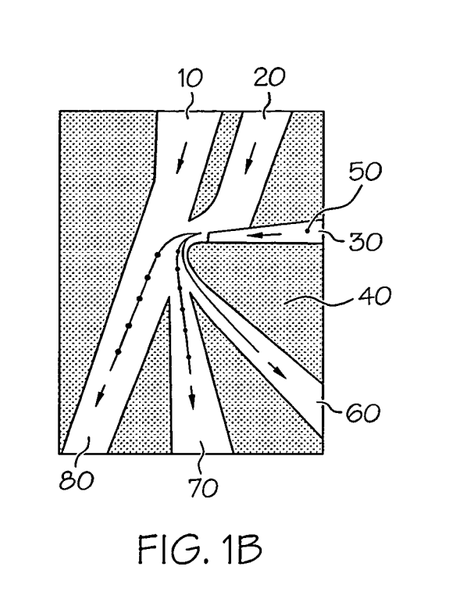
FIG. 1B represents a schematic front-view-cross-section of a Coanda block air classifier.

Referring to FIGS. 1A and 1B, the elbow-jet air classifier has width "w" between two sidewalls. Air or other suitable gas, such as carbon dioxide, nitrogen or argon flows through openings 10, 20 and 30 to create a jet-flow around Coanda block 40. Injecting polymeric microelements with a feeder 50, such as a pump or vibratory feeder, places the polymeric microelements in a jet stream that initiates the classification process. In the jet stream the forces of inertia, drag (or gas flow resistance) and the Coanda effect combine to separate the particles into three classifications. The fines 60 follow the Coanda block. The medium sized alkaline-earth metal oxide-containing particles have sufficient inertia to overcome the Coanda effect for collection as cleaned product 70. Finally, the coarse particles 80 travel the greatest distance for separation from the medium particles. The coarse particles contain a combination of i) alkaline earth metal oxide-containing particles having a particle size of greater than 5 μm; ii) alkaline earth metal oxide-containing regions covering greater than 50 percent of the outer surface of the polymeric microelements; and iii) polymeric microelements agglomerated with alkaline earth metal oxide-containing particles to an average cluster size of greater than 120 μm. These coarse particles tend to have negative impacts on wafer polishing and especially patterned wafer polishing for advanced nodes. The spacing or width of the separator determines the fraction separated into each classification. Alternatively, it is possible to close the fine collector to separate the polymeric microelements into two fractions, a coarse fraction and a cleaned fraction.

Examples

Separation

Figure 2:
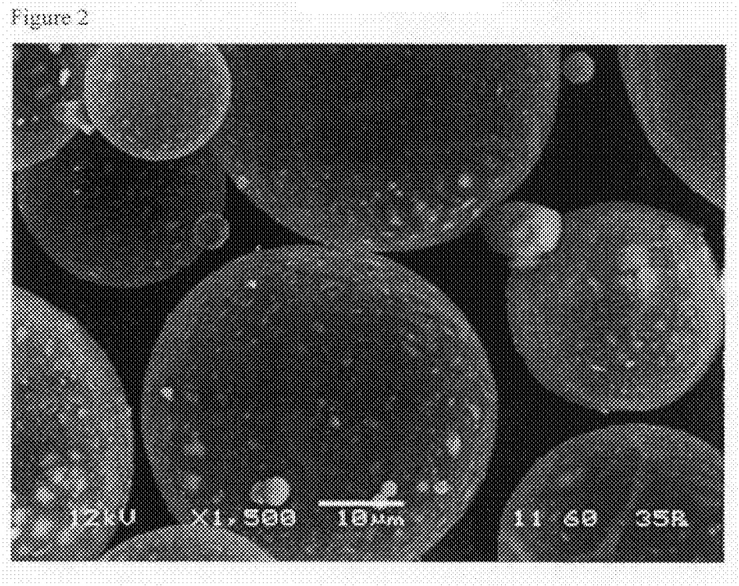
FIG. 2 is a 1,500×SEM of polyacrylonitrile/methacrylonitrile shells embedded with magnesium-calcium oxide particles.

An Elbow-Jet air classifier (Model EJ15-3S) from Matsubo Corporation provided separation of a sample of isopentane-filled copolymer of polyacrylonitrile and methacrylonitrile having an average diameter of 40 microns and a density of 30 g/liter. These hollow microspheres contained magnesium-calcium oxide-containing particles embedded in the copolymer. The magnesium-calcium oxide-containing particles covered approximately 5 to 15 percent of the outer surface area of the microspheres. In addition, the sample contained copolymer microspheres associated with magnesium-calcium oxide particles having a particle size of greater than 5 μm; ii) magnesium-calcium oxide-containing regions covering greater than 50 percent of the outer surface of the polymeric microelements; and iii) polymeric microelements agglomerated with magnesium-calcium oxide-containing particles to an average cluster size of greater than 120 μm. The Elbow-Jet classifier contained a Coanda block and the structure of FIGS. 1A and 1B. FIG. 2 illustrates desirable magnesium-calcium oxide-containing microspheres in the presence of fine particles. For the desirable microspheres, the white regions represent magnesium oxide-calcium oxide mineral particles embedded in the polymer shell. For the undesirable particles, the white region covers greater than half the particle or coats the entire particle. Feeding the polymeric microspheres through a vibratory feeder into the gas jet with selected settings produced the results of Table 1.

TABLE 1

| Example | Edge Type | Ejector Air Pressure [MPa] | Feed Rate kg/hr | Edge Position F⊿R [mm] | M⊿R [mm] | Yield F [%] | M [g] [%] | G [g] [%] |
|---|---|---|---|---|---|---|---|---|
| 1 | LE 50G | 0.30 | 1.06 | 7.0 | 25.0 | 32.2 | 67.4 | 0.4 |
| 2 | LE 50G | 0.30 | 0.88 | 5.0 | 20.0 | 10.2 | 89.6 | 0.2 |
| 3 | LE 50G | 0.30 | 0.75 | 3.0 | 20.0 | 4.8 | 94.9 | 0.3 |
| 4 | LE 50G | 0.30 | 0.50 | 7.0 | 15.0 | 50.6 | 31.6 | 17.8 |
| 5 | LE 50G | 0.30 | 1.05 | 5.0 | 20.0 | 13.5 | 86.1 | 0.4 |
| 6 | LE 50G | 0.30 | 1.12 | 7.0 | 25.0 | 20.4 | 79.4 | 0.2 |
| 7 | LE 50G | 0.30 | 0.83 | 4.0 | 20.0 | 7.0 | 92.8 | 0.2 |
| 8 | LE 50G | 0.30 | 0.92 | 4.0 | 20.0 | 8.7 | 90.6 | 0.7 |

The data of Table 1 show effective removal of fines [F] and coarse [G] materials. Example 7 provided 7 weight percent fines and 0.2 weight percent coarse material. Example 8, an extended run of Example 7, produced 8.7 weight percent fines and 0.7 weight percent coarse. The coarse material contained copolymer microspheres associated with magnesium-calcium oxide-containing particles having a particle size of greater than 5 μm; ii) magnesium-calcium oxide-containing regions covering greater than 50 percent of the outer surface of the polymeric microelements; and iii) polymeric microelements agglomerated with magnesium-calcium oxide-containing particles to an average cluster size of greater than 120 μm.

Figure 3:
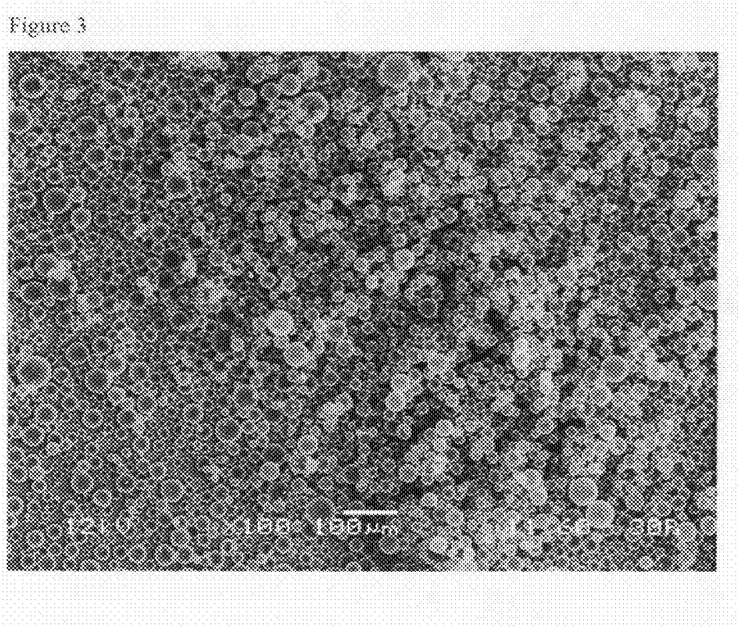
FIG. 3 is a 100×SEM of fine polyacrylonitrile/methacrylonitrile shells coated with magnesium-calcium oxide particles.
Figure 4:
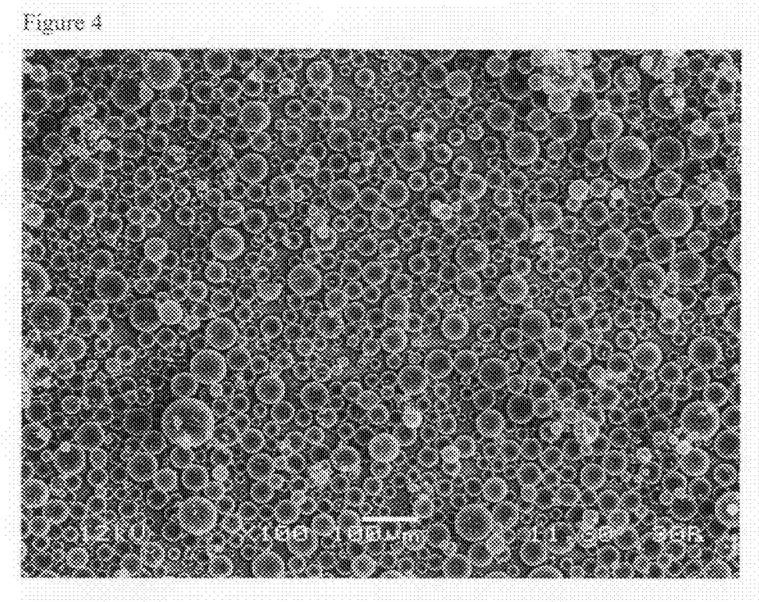
FIG. 4 is a 100×SEM of polyacrylonitrile/methacrylonitrile shells embedded with magnesium-calcium oxide particles after separation of the fine and coarse fractions.
Figure 5:
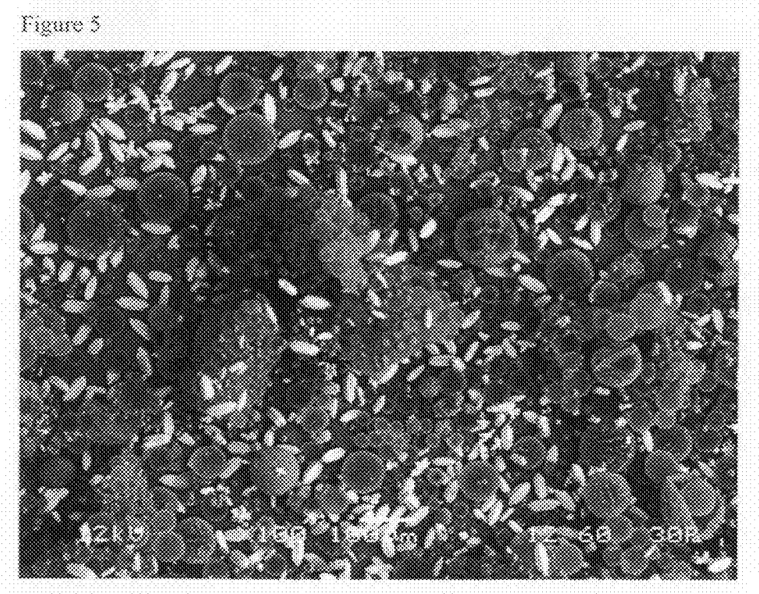
FIG. 5 is a 100×SEM of polyacrylonitrile/methacrylonitrile shell agglomerates and rice-shaped magnesium-calcium oxide particles.

Referring to FIGS. 3 to 5, FIG. 3 illustrates the fines [F], FIG. 4 illustrates the cleaned magnesium-calcium oxide-containing polymeric microspheres [M] and FIG. 5 illustrates the coarse [G] from the conditions of Examples 7 and 8. The fines appear to have a size distribution that contains only a minor fraction of medium-sized polymeric microelements. The coarse cut contains visible microelement agglomerates and polymeric microelements that have magnesium-calcium oxide-containing regions covering greater than 50 percent of their outer surfaces. The mid cut appears clear of most of the fine and coarse polymeric microelements. These SEM micrographs illustrate the dramatic difference achieved with the classification into three segments.

Effect on Pad Density

Table 2 provides microsphere formulations for casting polyurethane cakes used to make polishing pads:

TABLE 2

Polishing Pad Ingredients and Formulations

| Example | Microsphere | Shell Wall Tg (° C.) | Diameter (μm) | Wt % Microspheres |
|---|---|---|---|---|
| A | Poly(vinylidene-dichloride)/ Polyacrylonitrile/ Silica | 96 | 40 | 1.57 |
| 9 | Polyacrylonitrile/ Methacrylonitrile/ Magnesium-Calcium Oxide | 116 | 40 | 1.34 |

Polyurethane cakes were prepared by controlled mixing of an isocyanate-terminated urethane prepolymer (Adiprene® L325, 9.1% NCO, from Chemtura Corporation) with 4,4'-methylene-bis-o-chloroaniline (MBCA) as the curative. Prepolymer and curative temperatures were 51 and 116° C., respectively. The ratio of prepolymer to curative was set such that the stoichiometry, as defined by the percent ratio of $NH_2$ groups in the curative to NCO groups in the prepolymer, was 87%. These formulations illustrate the effects of the addition of different polymer microspheres to a hard polymer matrix. Specifically, without added polymeric microspheres the hardness of the Adiprene L325/MBOCA polymer matrix is 72 Shore D; and with the level of polymeric microspheres added in the above examples the hardness drops to 55 to 60 D Shore D.

Porosity was introduced into the formulations by adding microspheres such that the average density of pads from Comparative Examples A and Example B would be equivalent. In Comparative Example A, poly(vinylidenedichloride)/polyacrylonitrile shell walls interspersed with silica particles was used as the pore formation agent. For Example 1, polyacrylonitrile/methacrylonitrile shell walls interspersed with magnesium-calcium oxide particles was used. Both shell walls had the same average 40 micron microsphere diameter. The polyacrylonitrile/methacrylonitrile particles were classified prior to blending using the process technique and conditions described above.

Prepolymer, curative and microspheres were simultaneously mixed together using a high shear mix-head. After exiting the mix-head, the mixed ingredients were dispensed for 4 minutes into a 34 inch (86.4 cm) diameter circular mold to give a total pour thickness of approximately two inches (5.1 cm). The ingredients were allowed to gel for 15 minutes before being placed in a curing oven and then cured with the following cycle: 30 minutes ramp from ambient to a set point of 104° C., 15.5 hours at 104° C., and 2 hours with the set point reduced to 21° C.

The molded article was then "skived" (cut using a moving blade) at a temperature between 70 and 80° C. into approximately twenty thin sheets 80 mil (2.0 mm) thick. Skiving initiated from the cake's top surface with any incomplete sheets being discarded. (Each sheet can be subsequently converted into a polishing pad by grooving or perforating macrotexture into its surface and laminating to a compressible subpad.)

Figure 6:
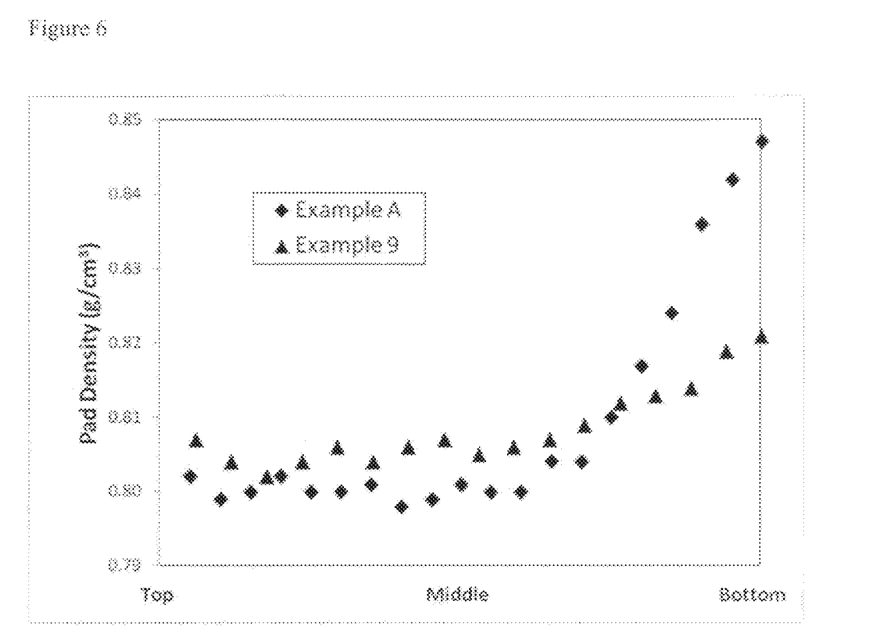
FIG. 6 is a plot of pad density versus location for polishing pads containing poly(vinylidenedichloride)/polyacrylonitrile/silica and polyacrylonitrile/methacrylonitrile/magnesium-calcium oxide shells.

The density of each sheet was determined by measuring its weight, thickness and diameter in accordance with ASTM Standard D1622. FIG. 6 shows the density of each sheet from the top to the bottom of the molded article.

The amount of polymeric microsphere added was adjusted to achieve the same level of porosity and density averaged over the entire molded article. For Comparative Example A and Example 1 the average density of all the sheets for both molded articles was the same at 0.809 g/cm$^3$.

However, since the chemical reaction between the prepolymer and curative was exothermic, a strong temperature gradient existed through the molded article, such that the bottom of the molded article was cooler than the middle or top regions. Exotherm temperatures for this prepolymer-curative combination exceeded the softening temperature (Tg) of the shell wall. Since these temperatures were achieved while the molded article was still gelling, the polymeric microsphere particles increased in diameter in response to the higher temperatures and a porosity profile developed within the molded article. This profile was pronounced in relation to the cooler bottom sheets cut from the molded article. The bottom layer sheets had higher densities than the rest of the sheets and may be out of specification causing them to be rejected and manufacturing yields decreased. Advantageously, all pads have a density or specific gravity within 5%. Most advantageously, it is possible to remove pads to leave all pads with a density or specific gravity that varies less than 2%.

In FIG. 6, Comparative Example A clearly illustrates the problem. When poly(vinylidenedichloride)/polyacrylonitrile was used as the pore formation agent, the density of the bottom layers were significantly higher than the targeted mean density value and must be rejected. In contrast, when polyacrylonitrile/methacrylonitrile is substituted in the same polymeric matrix formulation (Example 9), density variation from the top to the bottom of the cake is significantly reduced and yields for out of specification density values greatly reduced. The enhanced performance of the polyacrylonitrile/methacrylonitrile microspheres over poly(vinylidenedichloride)/polyacrylonitrile appear to be a direct consequence of their higher shell wall softening temperature. As discussed previously and shown in Table 2, Tg of the polyacrylonitrile/methacrylonitrile microspheres was 20° C. higher than that of poly(vinylidenedichloride)/polyacrylonitrile microspheres, effectively reducing their tendency to expand in response to high exotherm temperatures. The polyacrylonitrile/methacrylonitrile shells provided the additional advantage of being a chlorine-free polymer.

Figure 7:
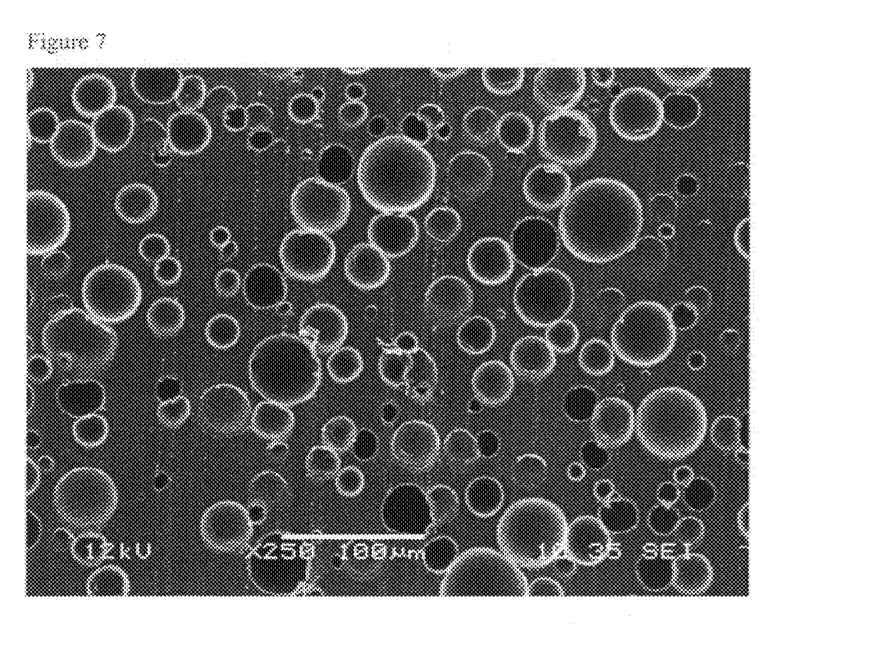
FIG. 7 is a 250×SEM of containing poly(vinylidenedichloride)/polyacrylonitrile/silica shells in a polyurethane matrix.
Figure 8:
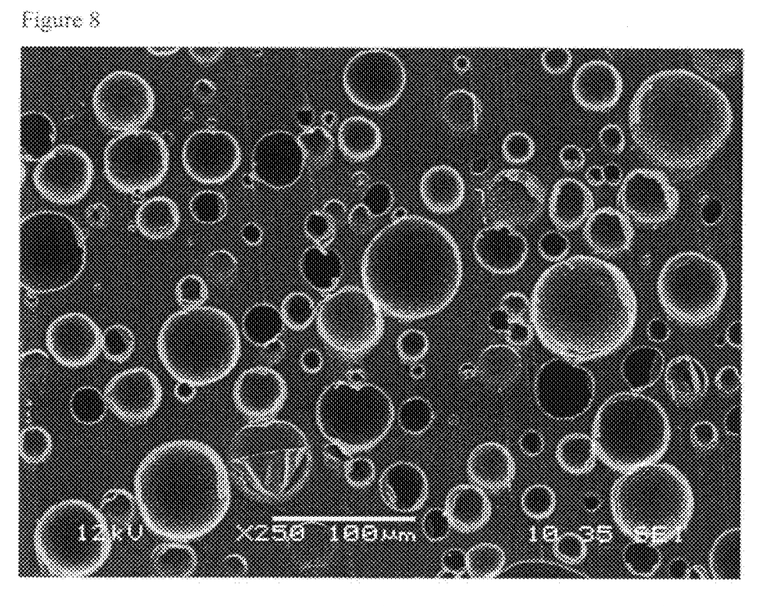
FIG. 8 is a 250×SEM of polyacrylonitrile/methacrylonitrile/magnesium-calcium oxide shells in a polyurethane matrix.

FIGS. 7 and 8 show SEM cross-sections of sheets of Comparative Example A and Example 9, respectively. A comparison of FIGS. 7 and 8 shows that the pore sizes are very similar. The figures also show in both cases that the microspheres are uniformly distributed throughout the polymer matrix. A subtle difference between the two figures is the presence of more shell wall fragments present for the polyacrylonitrile/methacrylonitrile microspheres. This is indicative of a less elastic and more brittle shell wall.

Skiving Comparison

Figure 9:
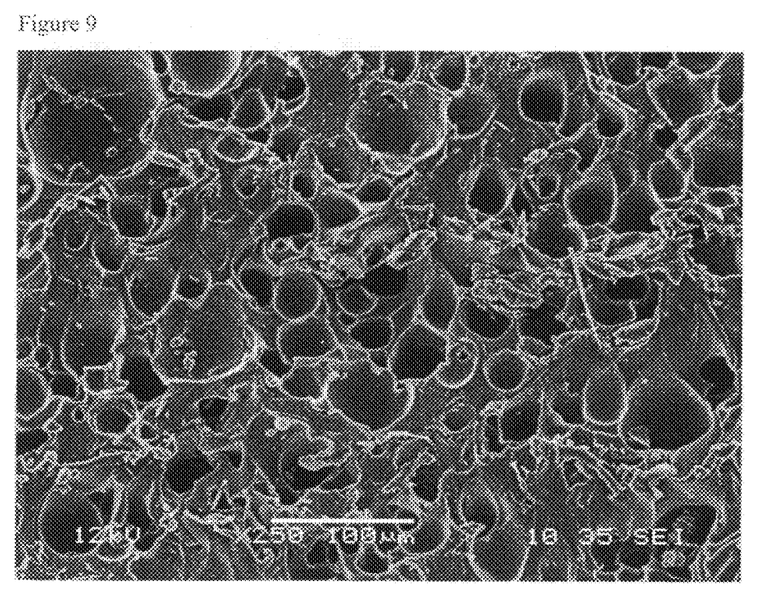
FIG. 9 is a 250×SEM of poly(vinylidenedichloride)/polyacrylonitrile/silica shells in a polyurethane matrix after skiving.
Figure 10:
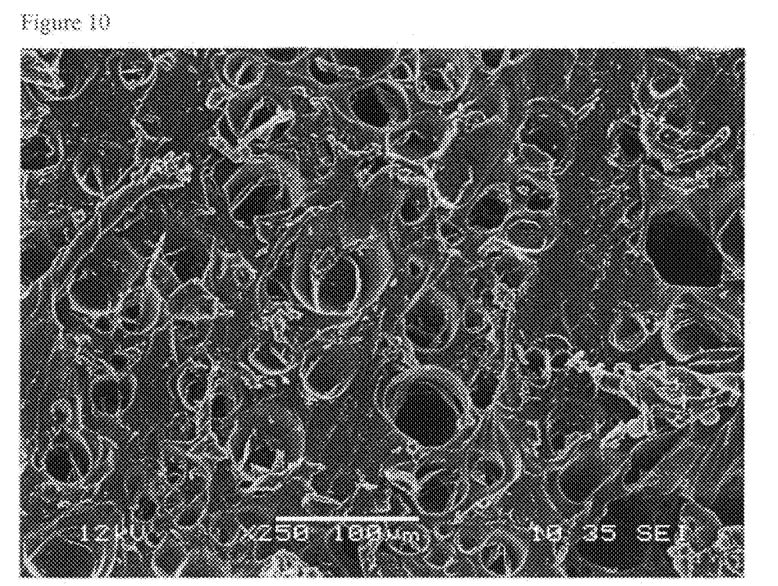
FIG. 10 is a 250×SEM of polyacrylonitrile/methacrylonitrile/magnesium-calcium oxide shells in a polyurethane matrix after skiving.

The difference is more pronounced for skived surfaces as shown in FIGS. 9 and 10. The skiving operation imparts more mechanical stress and is more likely to fracture the microspheres, especially if the shell walls are less ductile and more brittle.

More brittle particles can break into smaller pieces during subsequent diamond conditioning and polishing. This creates smaller polishing debris. Smaller polishing debris is less likely to scratch semiconductor wafers and result in fatal defects that could render the wafer being polished useless.

The surface roughness of the skived surfaces shown in FIGS. 9 and 10 were measured by a contact method using a Zeiss Profileometer (Model Surfcom 1500). A two micron tip diamond stylus (DM43801) was tracked across the pad surface and key surface roughness parameters determined. These included the average surface roughness (Ra), reduced peak height (Rpk), core roughness depth (Rk) and reduced valley depth (Rvk), as defined in "Introduction to Surface Roughness and Scattering" by Bennett and Mattsson.

Roughness values for Comparative Examples A and Example 1 are tabulated in Table 3:

TABLE 3

Surface Roughness Measurements

| Example | Roughness Parameters (microns) | | | |
|---|---|---|---|---|
| | Ra | Rpk | Rk | Rvk |
| A | 9.6 ± 0.2 | 7.0 ± 1.3 | 22.4 ± 0.3 | 22.2 ± 1.6 |
| 9 | 10.9 ± 0.5 | 14.8 ± 0.8 | 29.1 ± 4.0 | 22.3 ± 1.0 |

All roughness parameters were higher for the pad containing the polyacrylonitrile/methacrylonitrile microspheres. Typically, a higher surface roughness results in higher removal rates during polishing and hence increased wafer throughput.

Effect of Microelement on Pad Properties in Soft Formulations

The next examples illustrate the effect of adding either 40 micron diameter poly(vinylidenedichloride)/polyacrylonitrile or polyacrylonitrile/methacrylonitrile microspheres to a much softer matrix. Formulations and processing conditions are summarized in Table 4:

TABLE 4

Pad Formulations

| Formulation | Example B | Example C | Example 10 |
|---|---|---|---|
| Prepolymer | Imuthane® 27-95A | Imuthane® 27-95A | Imuthane® 27-95A |
| % NCO | 9.06 | 9.06 | 9.06 |
| Weight of Prepolymer (g) | 250 | 250 | 250 |
| Weight Curative (Butane diol) (g) | 23.4 | 23.2 | 23.3 |
| Curative Equivalent Weight | 45 | 45 | 45 |
| Stoichiometry (OH/NCO) (%) | 96 | 96 | 96 |
| Microsphere | None | poly(vinylidenedichloride)/polyacrylonitrile/silica | polyacrylonitrile/methacrylonitrile/magnesium-calcium oxide |
| Weight % Microsphere | 0.00 | 2.00 | 2.00 |
| Weight of Microsphere (g) | 0.00 | 5.00 | 5.00 |
| Volume % Porosity in Pad | 0 | 40 | 40 |
| Catalyst | Dabco 33-LV | Dabco 33-LV | Dabco 33-LV |
| Catalyst Weight % wrt Curative | 0.210 | 0.210 | 0.210 |
| Prepolymer Temperature (° C.) | 80 | 80 | 80 |
| Curative Temperature (° C.) | 80 | 80 | 80 |
| Aluminum Mold Temperature (° C.) | 115 | 115 | 115 |
| Degas Prepolymer and Curative | Yes | Yes | Yes |
| Vortex Mix Time (sec) | 30 | 30 | 30 |
| Curing cycle | 16 hrs at 115° C. | 16 hrs at 115° C. | 16 hrs at 115° C. |
| Total Gel-time at 115° C. (m:s) | 4:28 | 4:01 | 2:52 |

In these formulations, the prepolymer (Imuthane® 27-95A from COIM USA Inc.) used was polyether-based terminated with 4,4'-diphenylmethane diisocyanate (MDI) and cured with 1,4-butanediol. A small amount of amine catalyst (Dabco® 33-LV from Air Products) was used to accelerate the urethane reaction. These formulations were made in the laboratory using a vortex mixer to thoroughly mix the prepolymer, curative and microspheres together. After mixing, these were poured into aluminum molds and cured at elevated temperature to form sheets approximately 12 cm wide by 20 cm long by 2 mm thick for physical property characterization.

Table 5 summarizes key physical properties for the formulations of Table 4.

TABLE 5

Soft Pad Physical Properties

| Property | Test Method | Example B | Example C | Example 10 |
|---|---|---|---|---|
| Hardness (Shore D) | ASTM D 2240 | 42.2 | 25.5 | 26.3 |
| Density (g/cm³) | ASTM D 1622 | 1.08 | 0.66 | 0.66 |
| Tensile Strength (MPa) | ASTM D412 | 12.6 | 9.6 | 12.6 |
| Elongation to Break (%) | ASTM D412 | 251 | 384 | 528 |
| Toughness (MPa) | ASTM D412 | 23.2 | 25.1 | 40.5 |
| 100% Modulus (MPa) | ASTM D412 | 8.9 | 5.4 | 5.3 |
| Microsphere Softening Peak Temperature (° C.) | ASTM D5279 | | 94 | 116 |
| Pad Modulus (G') at 100° C. (MPa) | ASTM D5279 | 12.2 | 7.2 | 10.4 |

Addition of the polymer microspheres to the polymer reduced both hardness and density; and from a comparison of Comparative Example C and Example 10, it is apparent that there is little difference between the additions of either microsphere formulation.

Figure 11:
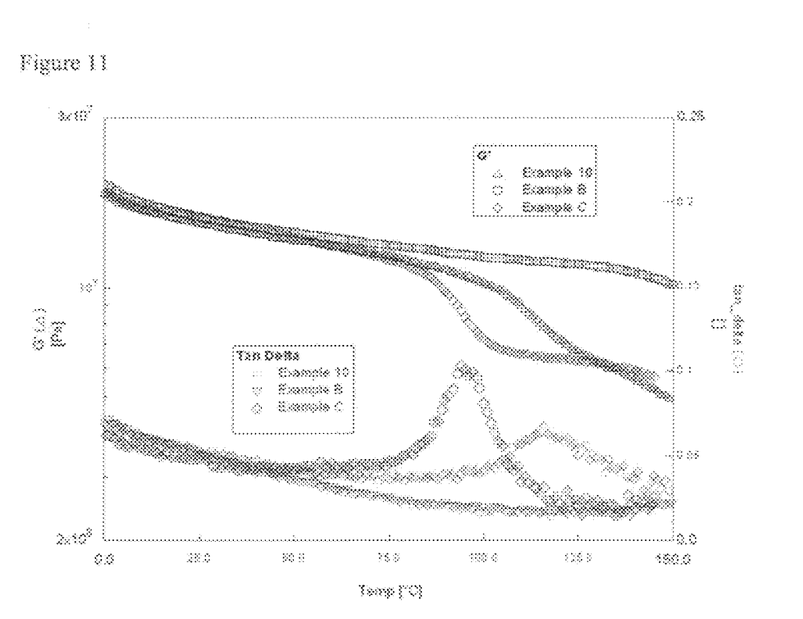
FIG. 11 is a shear modulus plot for Comparative Examples B and C and Example 10.

However, the differing softening temperatures of poly(vinylidenedichloride)/polyacrylonitrile and polyacrylonitrile/methacrylonitrile microspheres has an impact on pad modulus at elevated temperatures. As discussed earlier, the polyacrylonitrile/methacrylonitrile shell had a higher softening temperature than the poly(vinylidenedichloride)/polyacrylonitile shell. As shown by the dynamic mechanical data of FIG. 11, this has the effect of maintaining higher modulus values at elevated temperatures. During polishing the asperity tips of the pad surface become locally heated from the friction of polishing and can excessively soften. A higher modulus beneficially increases asperity life and decreases the need for the asperities to be regenerated by diamond conditioning.

Figure 12:
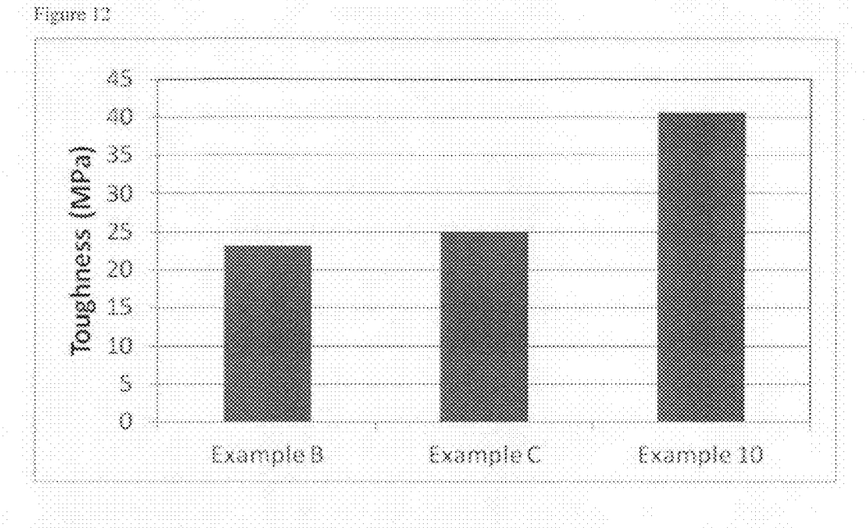
FIG. 12 is a plot illustrating toughness for pads containing no shells, poly(vinylidenedichloride)/polyacrylonitrile/silica shells and polyacrylonitrile/methacrylonitrile/magnesium-calcium oxide shells.

The tensile data shown in Table 5 are both unexpected and advantageous. Usually when porosity is introduced into a polymer, all tensile properties such as modulus, tensile strength, elongation to break and toughness decrease. This is not the case for the formulations of Table 4. As expected, with the addition of the polymeric microspheres modulus decreases. However, tensile strength only decreases for the poly(vinylidenedichloride)/polyacrylonitrile microspheres and the addition of either poly(vinylidenedichloride)/polyacrylonitrile microspheres or especially polyacrylonitrile/methacrylonitrile microspheres increases elongation to break and toughness values, where toughness is measured as the area under the stress-strain curve. Toughness values are plotted in FIG. 12.

A comparison of Comparative Examples B, C and Example 10 indicate that the addition of polyacrylonitrile/methacrylonitrile microspheres favorably increases pad toughness compared to the addition of poly(vinylidenedichloride)/polyacrylonitrile and even with respect to the non-porous control. This behavior suggests the microspheres are well adhered to the surrounding polymer matrix and that more energy is required to fracture pad formulations containing polyacrylonitrile/methacrylonitrile microspheres.

The dog-bone samples used to obtain the tensile data were examined by scanning electron microscopy of the microspheres after fracture. Residual strain remains in the narrow section of the dog-bone after testing. Photographs taken perpendicular to the strain direction were used to provide insight into the failure mode.

Figure 13:
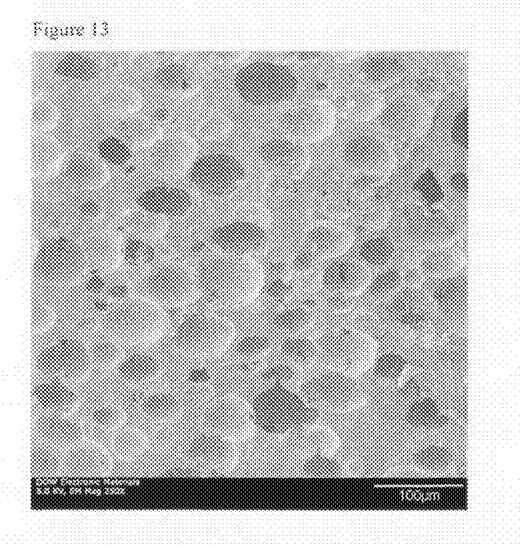
FIG. 13 is a 250×SEM illustrating the fracture morphology for Comparative Example C.
Figure 14:
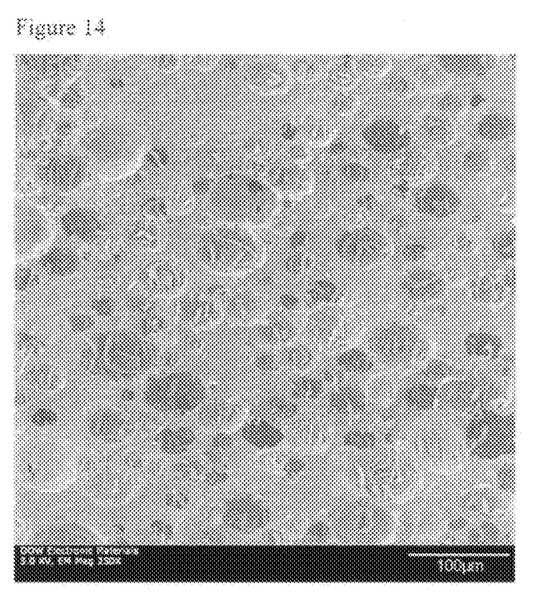
FIG. 14 is a 250×SEM illustrating the fracture morphology for Example 10.

FIGS. 13 and 14 show failure behavior of Comparative Example C and Example 10. In neither case were voids apparent that would be consistent with the microspheres separating from the polymer matrix. This supports the above suggestion that the microspheres were well adhered. However, in FIG. 14 many shell fragments are present in the pore structure. As the pad was stretched the well adhered microsphere shell wall also stretched but, given its higher Tg and hence more rigid polymer structure, the shell wall fractures but remained attached to the surrounding polymer matrix. Since additional energy is required to break the shell walls, toughness values increase significantly.

The polishing pads of the invention include magnesium-calcium oxide-containing particles distributed in a consistent and uniform structure to reduce polishing defects. In particular, the composite particle structure of the claimed invention can reduce gouge and scratching defects for copper polishing with cast polyurethane polishing pads. In addition, the air classification can provide a more consistent product with less density and within pad variation.

The invention claimed is:

1. A method of preparing a alkaline-earth metal oxide-containing polishing pad useful for polishing at least one of semiconductor, magnetic and optical substrates comprising:
   a. introducing a feed stream of gas-filled polymeric microelements into a gas jet, the polymeric microelements having varied density, varied wall thickness and varied particle size, the polymeric microelements having alkaline-earth metal oxide-containing regions distributed on an outer surface of the polymeric microelements, the alkaline-earth metal oxide-containing regions being spaced to coat 1 to 40 percent of the outer surface of the polymeric microelements; and being associated with greater than a 0.1 weight percent total of the following: i) alkaline-earth metal oxide-containing particles having a particle size of greater than 5 µm; ii) alkaline-earth metal oxide-containing regions covering greater than 50 percent of the outer surface of the polymeric microelements; and polymeric microelements agglomerated with alkaline-earth metal oxide-containing-particles to an average cluster size of greater than 120 µm;
   b. passing the polymeric microelements in the gas jet adjacent a Coanda block, the Coanda block having a curved wall for separating the polymeric microelements with Coanda effect, inertia and gas flow resistance;
   c. separating the i) alkaline-earth metal oxide-containing particles having a particle size of greater than 5 µm; ii) alkaline-earth metal oxide-containing regions covering greater than 50 percent of the outer surface of the polymeric microelements; and iii) polymeric microelements agglomerated with alkaline-earth metal oxide-containing particles to an average cluster size of greater than 120 µm associated with the polymeric microelements from the curved wall of the Coanda block to clean the polymeric microelements;
   d. collecting the polymeric microelements with less than 0.1 weight percent total of the polymeric microelements being associated with i) alkaline-earth metal oxide-containing particles having a particle size of greater than 5 µm; ii) alkaline-earth metal oxide-containing regions covering greater than 50 percent of the outer surface of the polymeric microelements; and iii) polymeric microelements agglomerated with alkaline-earth metal oxide-containing particles to an average cluster size of greater than 120 µm; and
   e. inserting the polymeric microelements into a polymeric matrix to form a polishing pad.

2. The method of claim 1 wherein the polymeric microelements include alkaline-earth metal oxide-containing fines and including the additional step of separating the polymeric microelements from the alkaline-earth metal oxide-containing fines with the wall of the Coanda block.

3. The method of claim 2 wherein the separating of the alkaline-earth metal oxide-containing fines and separating the i) alkaline-earth metal oxide-containing particles having a particle size of greater than 5 µm; ii) alkaline-earth metal oxide-containing regions covering greater than 50 percent of the outer surface of the polymeric microelements; and iii) polymeric microelements agglomerated with alkaline-earth metal oxide-containing particles to an average cluster size of greater than 120 µm associated with the polymeric microelements occur in a single step.

4. The method of claim 1 including the additional step of directing two additional gas streams into the polymeric microelements to facilitate separating the polymeric microelements from the i) alkaline-earth metal oxide-containing particles having a particle size of greater than 5 µm; ii) alkaline-earth metal oxide-containing regions covering greater than 50 percent of the outer surface of the polymeric microelements; and iii) polymeric microelements agglomerated with alkaline-earth metal oxide-containing particles to an average cluster size of greater than 120 µm associated with the polymeric microelements.

5. The method of claim 1 wherein the inserting the polymeric microelements into a polymeric matrix includes mixing the polymeric microelements into a liquid polymer matrix.

6. A method of preparing a alkaline-earth metal oxide-containing polishing pad useful for polishing at least one of semiconductor, magnetic and optical substrates, the alkaline earth element being calcium oxide, magnesium oxide or a mixture of calcium and magnesium oxides, comprising:
   a. introducing a feed stream of gas-filled polymeric microelements into a gas jet, the polymeric microelements having varied density, varied wall thickness and varied particle size, the polymeric microelements having alkaline-earth metal oxide-containing regions distributed on an outer surface of the polymeric microelements, the alkaline-earth metal oxide-containing regions being spaced to coat less than 50 percent of the outer surface of the polymeric microelements; and being associated with greater than a 0.2 weight percent total of the following: i) alkaline-earth metal oxide-containing particles having a particle size of greater than 5 µm; ii) alkaline-earth metal oxide-containing regions covering greater than 50 percent of the outer surface of the polymeric microelements; and iii) polymeric microelements agglomerated with alkaline-earth metal oxide-containing particles to an average cluster size of greater than 120 µm;
   b. passing the polymeric microelements in the gas jet adjacent a Coanda block, the Coanda block having a curved wall for separating the polymeric microelements with Coanda effect, inertia and gas flow resistance;
   c. separating the i) alkaline-earth metal oxide-containing particles having a particle size of greater than 5 µm; ii) alkaline-earth metal oxide-containing regions covering greater than 50 percent of the outer surface of the polymeric microelements; and iii) polymeric microelements agglomerated with alkaline-earth metal oxide-containing particles to an average cluster size of greater than 120 µm associated with the polymeric microelements from the curved wall of the Coanda block to clean the polymeric microelements;
   d. collecting the polymeric microelements with less than 0.1 weight percent total of the polymeric microelements being associated with i) alkaline-earth metal oxide-containing particles having a particle size of greater than 5

μm; ii) alkaline-earth metal oxide-containing regions covering greater than 50 percent of the outer surface of the polymeric microelements; and iii) polymeric microelements agglomerated with alkaline-earth metal oxide-containing particles to an average cluster size of greater than 120 μm; and e. inserting the polymeric microelements into a polymeric matrix to form a polishing pad.

7. The method of claim 6 wherein the polymeric microelements include alkaline-earth metal oxide-containing fines and including the additional step of separating the polymeric microelements from the alkaline-earth metal oxide-containing fines with the wall of the Coanda block.

8. The method of claim 7 wherein the separating of the alkaline-earth metal oxide-containing fines and separating the i) alkaline-earth metal oxide-containing particles having a particle size of greater than 5 μm; ii) alkaline-earth metal oxide-containing regions covering greater than 50 percent of the outer surface of the polymeric microelements; and iii) polymeric microelements agglomerated with alkaline-earth metal oxide-containing particles to an average cluster size of greater than 120 μm associated with the polymeric microelements occur in a single step.

9. The method of claim 6 including the additional step of directing two additional gas streams into the polymeric microelements to facilitate separating the i) alkaline earth metal oxide-containing particles having a particle size of greater than 5 μm; ii) alkaline-earth metal oxide-containing regions covering greater than 50 percent of the outer surface of the polymeric microelements; and iii) polymeric microelements agglomerated with alkaline-earth metal oxide-containing particles to an average cluster size of greater than 120 μm associated with the polymeric microelements.

10. The method of claim 6 wherein the inserting the polymeric microelements into a polymeric matrix includes mixing the polymeric microelements into a liquid polymer matrix and casting the liquid polymer matrix with the polymeric microelements into a mold.

\* \* \* \* \*